United States Patent [19]

Carlson, Jr.

[11] Patent Number: 4,640,492
[45] Date of Patent: Feb. 3, 1987

[54] INVOLUTE VALVE CLOSURE

[75] Inventor: William L. Carlson, Jr., St. Cloud, Minn.

[73] Assignee: General Signal Corporation, Stamford, Conn.

[21] Appl. No.: 694,097

[22] Filed: Jan. 23, 1985

[51] Int. Cl.$^4$ .......................... F16K 25/00; F16K 5/00
[52] U.S. Cl. .................................... 251/163; 251/298; 251/309; 251/314
[58] Field of Search ............... 251/162, 163, 298, 304, 251/309, 356, 314; 137/375

[56] References Cited

U.S. PATENT DOCUMENTS

| | | | |
|---|---|---|---|
| 2,015,849 | 10/1935 | Hardies | 251/163 |
| 2,263,907 | 11/1941 | Stanton | 251/356 |
| 2,659,388 | 11/1953 | Rand | 251/274 |
| 2,738,948 | 3/1956 | Barnes | 251/298 |
| 2,803,426 | 8/1957 | DeZurik | 251/301 |
| 3,420,498 | 1/1969 | Housworth | 251/306 |
| 3,809,361 | 5/1974 | Pfundstein | 251/305 |
| 4,022,178 | 5/1977 | Cross et al. | 251/314 |
| 4,274,436 | 6/1981 | Smith | 137/375 |
| 4,510,966 | 4/1985 | Parsons, Jr. | 137/375 |

FOREIGN PATENT DOCUMENTS 1087912  3/1955  France .................. 251/298

Primary Examiner—Martin P. Schwadron
Assistant Examiner—Sheri M. Novack
Attorney, Agent, or Firm—Barnes & Thornburg

[57] ABSTRACT

A rotary valve for fluid flow control is provided having curved sealing surfaces, at least one of which has a cross-sectional arc segment forming a portion of an involute, for a valve closure member and a fluid port valve seat or seating surface. By machining the sealing surfaces of the valve closure member and of the valve seat to the form of an involute, these surfaces will engage substantially simultaneously over the entire perimeter of the valve seat at initial closing contact and closed or sealed positions. After initial contact and during overclosure, if elastomeric surfaces are used, the compression and sealing of resilient seating material will be uniform over the entire engaging surface, and around the periphery of the valve seat.

19 Claims, 9 Drawing Figures

INVOLUTE VALVE CLOSURE

BACKGROUND AND SUMMARY OF THE INVENTION

The present invention relates generally to rotary valves and, more particularly, to fluid flow control plug valve closures.

Concentric plug-type rotary valves for fluid flow control typically include, as shown in FIG. 1A and 2, valve body or housing 100 disposed between multiple sections of pipe 102 in the fluid flow path. This valve housing contains a valve closure member 20 which is pivotal about axis 108, generally perpendicular (out of the plane of FIG. 1) to the primary direction of fluid flow along axis 104, and slides past surface 30 which defines port 10 in the fluid flow path to restrict the rate of fluid flow through that port. Surface 30 and valve closure member 20 are typically machined so as to have a common radius of curvature in order to form mating seats or surfaces which provide fluid sealing under various temperatures and pressures.

Since closure member 20 and/or surface 30 of the concentric valve discussed above would wear with contact, this type of valve has been generally used for flow control and not for complete shut off. Where complete shut off has been desired, prior rotating valves often have included eccentric valve closure members such as 20' which although pivotable about an axis 108, are shaped as segments of arcs with radius R swung about offset axis 110, as shown in FIG. 1B. Such arrangements attempt to permit the valve closure member to move toward eccentric valve seat 30' with minimum sliding contact therewith until the moment of complete closure. These offset axis valves are commonly referred to as "eccentric" valves. An example of such eccentric valve structure is shown in U.S. Pat. No. 2,803,426, issued to David DeZurik and assigned to the assignee of the present invention. As best illustrated in FIGS. 5 and 6 of that patent, the pivotal axis of the valve closure member lies along the centerline axis of fluid flow. The valve seat is machined to have inward sealing extensions which contact the face of the valve closure member. The cross-sectional curvature of the surface of these sealing extensions is eccentric with respect to the pivotal axis of the valve closure member, such that the constant radius of the sealing surface of the valve seat is swung from a point offset from the pivotal axis shown in FIG. 5 of that patent. This results, as seen in the Figures, in initial seat edge 30 projecting inwardly less than terminal seat edge 31.

To achieve proper sealing against fluid leakage through the port in eccentric valves, the valve closure member and the valve seat must be precisely aligned when brought together by rotation of the valve closure member. Machining and assembling these elements to within close manufacturing tolerances can become relatively expensive. To alleviate this problem, some prior art devices included spring arrangements to adjust the position of the valve elements with respect to each other within the valve body or housing. Unfortunately, such arrangements are rather complicated to assemble and do not compensate fully for dimensional variation with certain temperature and pressure changes nor function properly with fluids containing entrained particulate matter. Other problems are encountered with prior eccentric valve devices during overclosure, i.e., when the valve closure member is moved into too tight a contact with the valve seat. To prevent galling of the metal valve faces and yet provide tight shut-off without the use of sealing lubricants, it has been suggested to cover the valve closure member or the seat surface or both with an elastomeric material. However, when the valve seat and the valve closure member have sealing faces in the form of simple cylinders of circular arcs, the effectiveness of fluid sealing may vary over the perimeter of the port valve seat as the valve closure member moves from initial contact with the valve seat to closed and then to an overclosed position. FIGS. 3, 4 and 5 show enlarged partial cross-sectional views of a typical elastomer-covered eccentric valve closure of the offset pivotal axis type at three different closed valve positions which illustrate these situations. While eccentric valves of the type shown in the above-mentioned patent are not also shown explicitly in the present application, it will be readily understood by those skilled in the art that similar overclosure problems can arise therein also.

FIG. 3 shows, in a plane viewed parallel to the fluid flow taken along line I—I of FIG. 2, a portion of valve housing 100 containing port 10, valve closure member 20', and valve seat 30'. Valve closure member 20' is machined to have a curved surface or face in the form of an arc segment 21 of a circle of constant radius $R_{20'}$ extending from axis 105 (projecting out of the plane of the figure). Axis 105 is at the center of curvature of the arc face of valve closure member 20' and may, for example, be perpendicularly intersecting centerline axis 104 of fluid flow through port 10. Valve seat 30' may likewise be machined to have a sealing surface or perimeter face in the form of an arc segment 31 of a circle also of constant radius $R_{20'}$ less the interference required to seal the fluid under rated pressure. Thus, valve closure member 20' and valve seat 30' may have mating surfaces which extend coaxially from axis 105 to form adjacent concentric cylindrical circular arc segments.

The eccentric valve structure of FIG. 3 attempts to minimize the sliding together of valve closure member 20' and valve seat 30' until closure by pivoting or rotating valve closure member 20' about axis 108. As shown in FIG. 3, center of curvature axis 105 is offset laterally from axis 108 (exaggerated in the drawing). Also, center of curvature axis 105 follows an arc of circle 107 about rotational axis 108 as valve closure member 20' rotates. This can be readily seen by comparing the location of axis 105 with respect to transverse axis 109 in FIGS. 3-5. In FIG. 3, axis 105 is below axis 109; in FIG. 4, axis 105 intersects axis 109; and in FIG. 5, axis 105 is above axis 109.

Valve closure member 20', as mentioned above, is typically coated with elastomeric material 26 with the effective radius of the arc segment face of its sealing surface being equal to the value of $R_{20'}$. This elastomeric material coating may be compressible or deflectible during closure so as to permit tight sealing.

As shown in FIG. 3, the fluid flow through port 10 has been reduced by initial engagement of leading edge 22 of valve closure member 20' with valve seat 30' by clockwise rotation about axis 108. At this position, elastomeric material 26 has not been significantly compressed by valve seat 30' anywhere around the periphery of port 10. Thus, the opposing arc segment faces of valve closure member 20' and valve seat 30' have different clearances around the periphery of the valve seat 30'. This prevents complete mating of the opposing faces. While there may be no significant clearance between leading edge 22 and valve seat 30', there will be clearance between trailing edge 24 and valve seat 30', and an appreciable gap for fluid leakage between these edges at the centerline of port 10, indicated as Point A, as well as at the trailing edge 24. Thus, all the sealing surfaces of valve closure member 20' and valve seat 30' do not meet substantially simultaneously upon initial contact of leading edge 22 and seat 30'.

FIG. 4 shows the valve arrangement of FIG. 3 as valve closure member 20' is further rotated clockwise about axis 108 to the normally closed position where valve closure member 20' and valve seat 30' are in continuous contact along the arc from leading edge 22 to trailing edge 24. At this position, the deflection and sealing interference by compression of elastomeric coating 26 on valve closure member 20' is substantially equal about port 10 along the surface perimeter of valve seat 30'. Thus, substantially uniform fluid sealing is achieved without any gaps along the valve seat.

However, additional clockwise rotation of valve closure member 20' about axis 108 will result in an overclosed situation, not uncommon in practice, as shown in FIG. 5. In this position, the maximum fluid sealing interference of valve closure member 20' and valve seat 30' by compression of elastomeric material 26 is at point A. Lesser sealing interference and compression of elastomeric material 26 is along trailing edge 24 of valve closure member 20'. Least interference and coating compression is along leading edge 22. This uneven compression and deformation often results in destructive stresses on valve closure member 20' and coating 26. Such stresses reduce the useful lifetime of the valve and decrease sealing integrity as well as increase the required torque. As these stresses result from the different circular curvatures of the sealing surfaces, they may also be found in eccentric valves of the type shown in the above-mentioned patent.

Although the closure problems mentioned above were described as resulting largely from the addition of a typical elastomeric coating on the valve closure member, similar problems also arise where the materials forming either the valve closure member, the valve seat, and/or portions of the valve housing are significantly compressible as well as where these elements are formed from metallic materials. Sealing surfaces that are still compressible even at complete closure are generally desirable where the fluid flow may contain entrained solids which may become trapped between seating surfaces.

It is therefore an object of the present invention to provide an improved valve means.

Another object of the invention is the provision of a valve closure member having reduced wear during extended operation.

A further object of the present invention is to provide improved fluid sealing during normal closure and overclosure of a valve closure member.

Still another object of the present invention is the provision of a valve closure member having equal contact stresses along sealing surfaces which can be achieved with maximum construction and assembly tolerances.

Yet, still another object of the present invention is to reduce the torque required to effectively seal the fluid within a valve.

These and other objects of the present invention are achieved in the provision of shaped or curved sealing surfaces, at least one of whose cross-sectional arc segment forms a portion of an involute, for the valve closure member and the valve seat of a rotary valve means for controlling fluid flow therethrough by rotation of the valve closure member to sealingly engage the valve seat. By machining the sealing surfaces of the valve closure member and of the valve seat to the form of an involute, these surfaces will engage substantially simultaneously over the entire perimeter of the valve seat during valve closure even if the valve closure member has an elastomeric coating or seating material. After initial contact and during overclosure, the compression and sealing of resilient seating material will likewise be uniform over the entire engaging surface and around the periphery of the valve seat.

Other objects, advantages and novel features of the present invention will become apparent from the following detailed description of the invention when considered in conjunction with the accompanying drawings which show, for purposes of illustration and example only, preferred embodiments in accordance with the present invention.

DETAILED DESCRIPTION OF THE DRAWINGS

Figure 3:
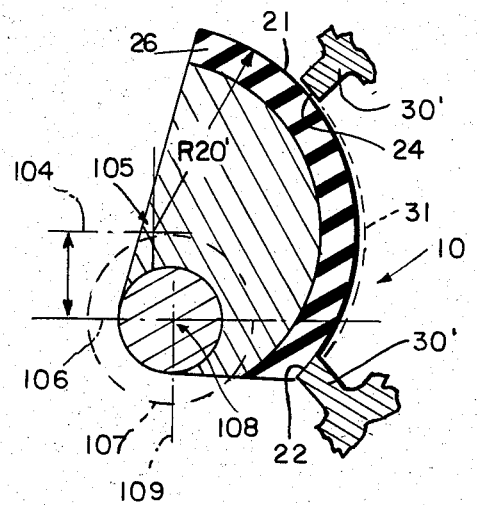
FIGS. 3 through 5 show exaggerated, partial cross-sectional top views of the eccentric rotary valve means of FIGS. 1B and 2 taken along line I—I of FIG. 2 in three successive closure positions which illustrate the deficiencies in the prior art.
Figure 4:
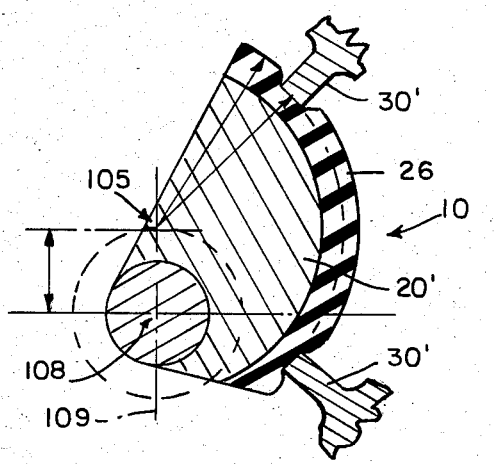
Figure 5:
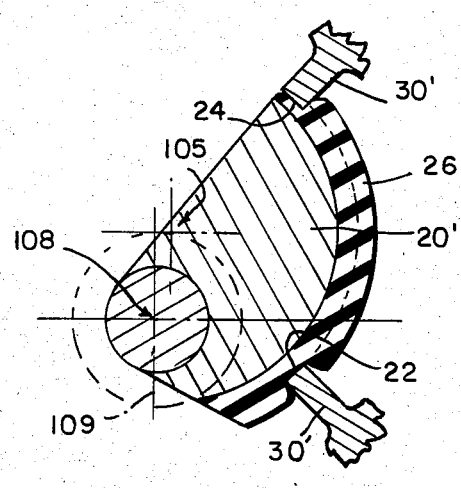
Figure 6:
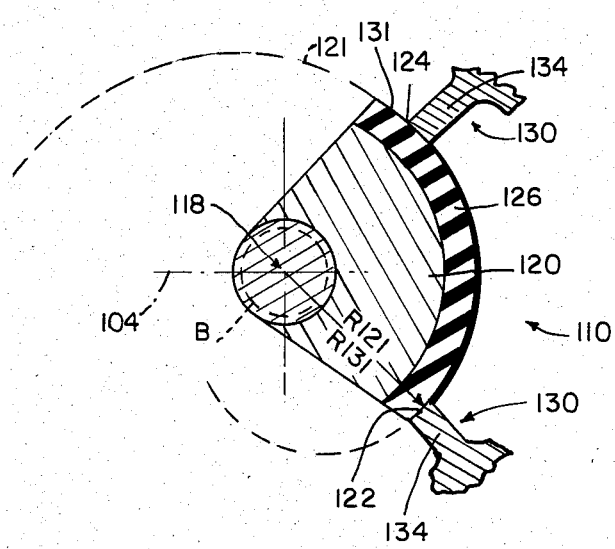
FIGS. 6 and 7 show exaggerated, partial cross-sectional top views of an eccentric rotary valve means, such as that shown in FIGS. 1 and 2, taken along line I—I of FIG. 2, as modified according to the principles of the present invention in initial contact and closed or overclosed positions, respectively.

FIG. 6, which illustrates a preferred embodiment of the present invention, shows a partial cross-sectional view of a rotary valve constructed according to the principles of the present invention. As in FIGS. 3 through 5, this is a perpendicular view of a plane parallel to centerline axis 104 along line I—I of FIG. 2. Valve closure member 120 is provided within a valve housing for controlling fluid flow along axis 104 through valve port means 110. Valve closure member 120 is pivotally mounted about axis 118 (perpendicular to the plane of FIG. 6) for rotation to sealingly engage valve seat 130, disposed about the periphery of valve port means 110. Valve seat 130 can be integrally formed on the housing or formed as a separate element.

As viewed cross-sectionally in FIG. 6, in especially preferred embodiments valve closure member 120 is machined to have a shaped or curved sealing surface or face in the form of an, arc segment 121 extending from axis 118 by a distance of $R_{121}$. In a given plane perpendicular to axis 118, this radial distance is not constant over the sealing surface of valve closure member 120. As shown in FIG. 6 $R_{121}$ increases as measured at different angular positions moving counterclockwise with respect to axis 118 over arc segment 121. For example, the radial distance to axis 118 is less at leading edge 122 than at trailing edge 124. Arc segment 121 forms a portion of an involute which, if extended, would follow the dashed lines shown in FIG. 6. The base figure of this involute is considered to be, for example, a circle B about axis 118.

By "involute", the present invention refers to a planar curled figure as may be formed by the locus or curve traced by a fixed point on a taut, inextensible string as it unwinds in a fixed plane from a polygon curve or base, such as a circle. A characteristic of involutes generated from a common base circle is that the perpendicular distance between involutes is everywhere the same regardless of their angular displacement about the axis of their common base circle.

As used in the embodiments of the present invention, an "involute", when viewed cross-sectionally, forms a curved sealing surface of increasing radius wherein the distance from the axis of rotation to the sealing surface differs from one point on the sealing surface to another point on the sealing surface. In particular, this distance from the axis of rotation increases as the point of measurement is taken further along the sealing surface. Additionally, such an involute is characterized in that no three points on the sealing surface are equidistant from the axis of rotation or in that the sealing surface is formed with a plurality of steps thereon. Each of these steps can, for example, also have a non-linear cross-sectional configuration.

In especially preferred embodiments of the present invention valve closure member 120 and valve seat 130 are machined to provide for mating surfaces or faces in order to improve sealing against fluid flow through valve port means 110. Thus, valve seat 130 likewise has curved sealing surfaces which lie along an arc segment 131. In a given plane perpendicular to axis 118, arc segment 131 extends from axis 118 by a radial distance $R_{131}$ which varies in magnitude continuously along the sealing surface forming a portion of an involute having a base, for example, of circle B. With the two involutes of valve closure member 120 and valve seat 130 shown, their base figures have a common configuration and diameter. Where arc segments 121 and 131 themselves present mating surfaces, at the initial contact, normally closed or overclosed positions of valve closure member 120 with respect to valve seat 130, the difference between $R_{121}$ and $R_{131}$ is substantially equal at each point of engagement. Also, for example, when a cylindrical plug valve arrangement is employed, these mating surfaces extend coaxially from axis 118.

Figure 1A:
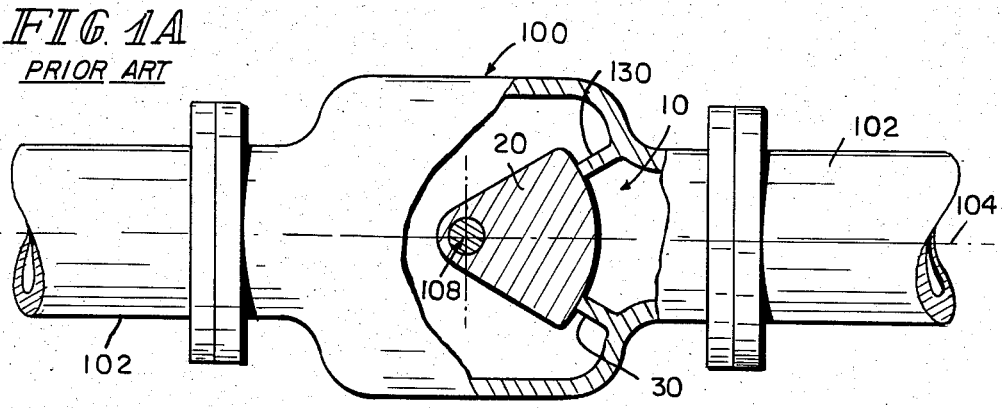
FIG. 1A shows a cross-sectional top view of a typical concentric rotary plug valve according to the prior art.
Figure 1B:
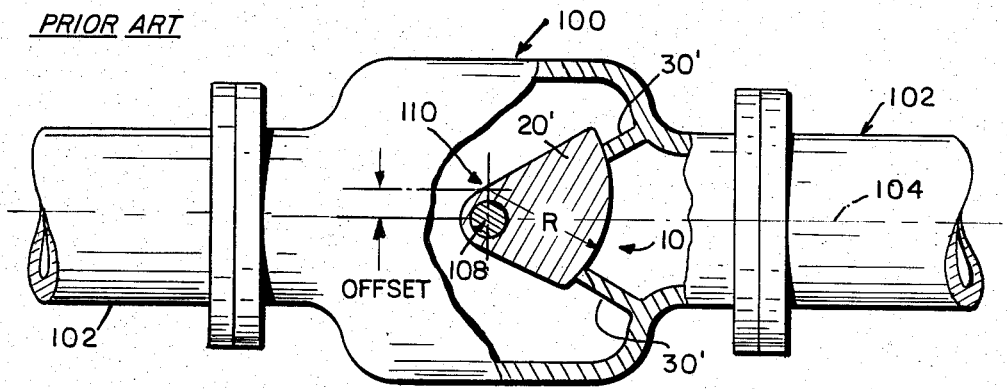
FIG. 1B shows a cross-sectional top view of a typical eccentric rotary valve means according to the prior art.
Figure 2:
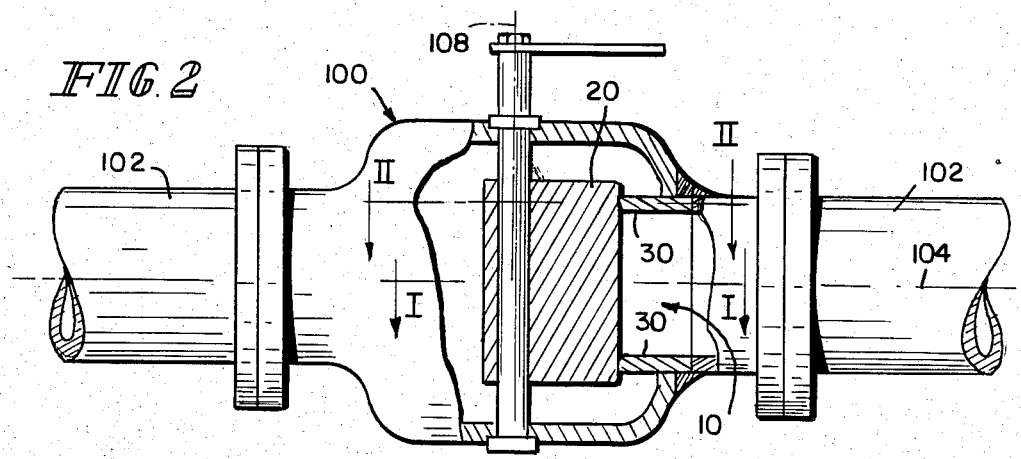
FIG. 2 shows a cross-sectional side view of a typical eccentric rotary valve means according to the prior art.
Figure 8:
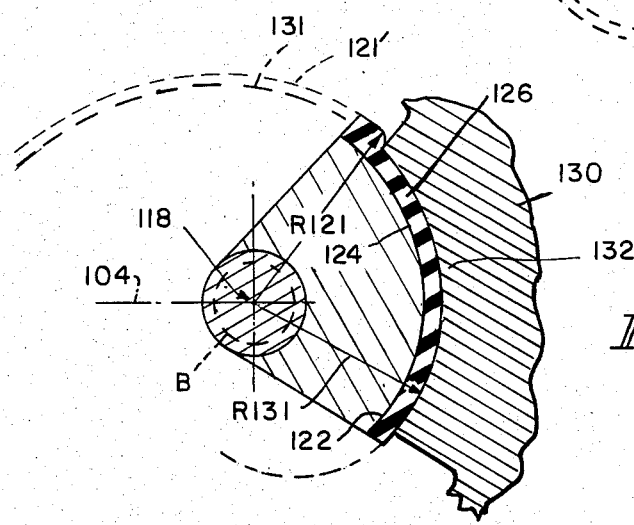
FIG. 8 shows a partial cross-sectional top view of an eccentric rotary valve means, such as that shown in FIGS. 1 and 2, taken along line II—II of FIG. 2 in the normally closed position shown in FIG. 6, as modified according to the principles of the present invention.

To further understand the configuration of valve seat 130, FIG. 6 may be compared with FIG. 8, which illustrates a partial cross-sectional view of the same improved rotary valve shown in FIG. 6 as seen in a perpendicular view of plane parallel to centerline axis 104 along line II—II of FIG. 2. As will be readily understood by those skilled in the art, the portions of valve seat 130 seen in FIG. 6 includes cross sections of side walls 134. Likewise, the portion of valve seat 130 seen in FIG. 8 includes the cross section of top wall 132 which bridges side walls 134. In especially preferred embodiments of the present invention, the curved sealing surface of top wall 132 of valve seat 130 is formed as a continuous involute lying along arc segment 131.

Curved sealing surfaces of the side walls 134 are formed as portions of that involute spaced apart along arc segment 131. However, the present invention specifically contemplates embodiments wherein one or the other of valve closure member 120 and valve seat 130 are not formed to provide identically curved mating faces over their entire sealing surfaces. For example, where side walls 134 are sufficiently narrow, the sealing surface at those walls may be substantially linear, especially where one or the other sealing surfaces is compressible.

In another especially preferred embodiment of the present invention, valve closure member 120 is provided with compressible elastomeric coating 126 of, for example, a constant ⅛ inch or 3.18 mm in thickness over its entire sealing surface. Although coating 126 will increase the effective radial distance of the sealing surface of valve closure member 120 from axis 118 to a value of $R_{121'}$, because of the nature of the involute faces the closure problems found in the prior art are avoided. Since the involute face of valve closure member 120 and valve seat 130 extend from the same base figure, the perpendicular distances between these faces will be the same over the entire curve. The effect of increasing $R_{121}$ is merely to require less rotation of valve closure member 120 to achieve closure because this radial distance increases with outward expansion of the involute anyway. Therefore, as valve closure member 120 rotates about axis 118 to an initial closure position as shown in FIG. 6, all the sealing portions of the engaging surfaces will meet substantially simultaneously rather than a leading edge engaging first. This will permit uniform fluid sealing of valve closure member 120 at every closure stage as well as equal compression of elastomeric material 126 over the entire sealing surface perimeter of valve seat 130 as valve closure member 120 continues to rotate about axis 118 to normally closed and overclosed positions.

Figure 7:
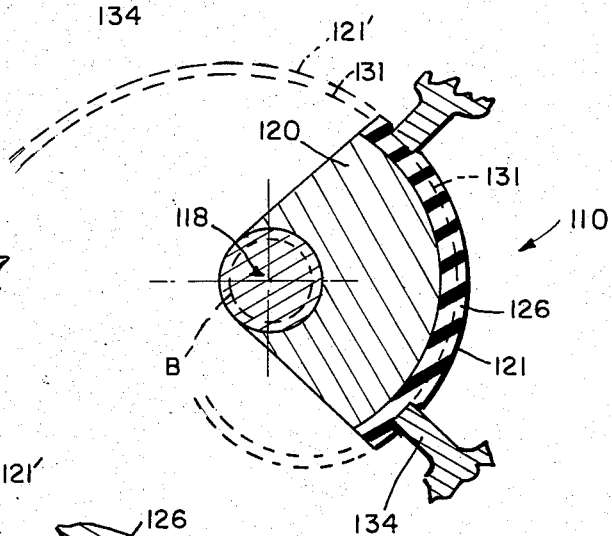

More specifically, FIG. 7 shows the same portions of the rotary valve illustrated in FIG. 6 after complete closure and during any overclosure permitted by excess compression of valve materials, particularly coating 126, which may be provided to accommodate the presence of small solids in the fluid without loss of fluid sealing. Although subject to some minimal sliding engagement, all the sealing surfaces are subject to equal deformation interferences and destructive stresses during all levels of closure after initial engagement of the surfaces. Thus, proper sealing integrity and the useful lifetime of the valve are prolonged, while requiring minimum torque to seal to the rated pressure.

Another benefit of employing involute faces according to the present invention is that the allowable machining and assembly tolerances are increased so the costs of the valve structure are reduced. Further, the necessary alignment precision of the valve closure member and valve seat may be less since pivotal axis 118 of the valve closure member, and the axis of the involute base circles are congruent.

While the present invention has been illustrated with a valve closure member pivotal about an axis generally perpendicular to the primary direction of fluid flow, it should be clearly understood that other valve closure member orientations are suitable for and contemplated by the present invention. Likewise, while the base figure of the involutes has been selected in the preferred embodiment as a circle or infinitely sided polygon, various other figures, including both a point, curved shapes and finite-sided polygons, may be useful in other embodiments for the present invention. For example, the base figure may form an ellipse or an octagon. Further, while the valve closure member and valve seat have been described cross-sectionally above precisely as an involute, the present invention contemplates other cross-sectional configurations wherein the distance from the axis of rotation to the sealing surface increases from one point on the sealing surface to another point on the sealing surface, and where no three points on the sealing surface are equidistant from the axis of rotation or where the sealing surface includes a plurality of steps.

Although the present invention has been described and illustrated above in detail, it is to be clearly understood that the same is by way of illustration and example only and is not to be taken by way of limitation. The spirit and scope of this invention are to be limited only by the terms of the appended claims.

What is claimed is:

1. Rotary valve means for controlling fluid flow therethrough, comprising:
   valve housing means having fluid passageway therethrough;
   valve closure member movably supported in said valve housing means about a pivotal axis and having a shaped sealing surface; and
   valve seat surface means within said valve housing means for engagement with said shaped sealing surface of said valve closure member to restrict fluid flow through said fluid passageway means, said valve seat surface means having, with respect to a plane perpendicular to said pivotal axis, an arc segment forming a sufficient portion of an involute so as to not form a portion of an eccentrically mounted circle such that the sealing portions of said shaped sealing surface and said valve seat surface means engage substantially simultaneously upon closure of said rotary valve means.

2. The rotary valve means according to claim 1, wherein said valve closure member is pivotally supported along the axis of the involute of said valve seat surface means.

3. The rotary valve means according to claim 1, wherein said shaped sealing surface of said valve closure member includes, with respect to a plane perpendicular to said pivotal axis, an arc segment forming a portion of a mating involute with respect to said involute of said valve seat surface means.

4. The rotary valve means according to claim 1, wherein said valve seat surface means includes a circumferential elastomeric coating means, and wherein said coating means is subject to equal interference over its sealing perimeter when said shaped sealing surface engages said valve seat surface means.

5. The rotary valve means according to claim 1 wherein said pivotal axis intersects perpendicularly an axis parallel with the primary fluid flow through said fluid passageway.

6. Rotary valve means for controlling fluid flow therethrough comprising:
   valve housing means having fluid passageway therethrough;
   valve closure member movably supported in said valve housing means about a pivotal axis, said valve closure member having a shaped sealing surface which, when viewed with respect to a plane perpendicular to said pivotal axis, includes an arc segment which forms a sufficient portion of an involute so as to not form a portion of an eccentrically mounted circle; and
   valve seat surface means within said valve housing means for engagement with said shaped sealing surface of said valve closure member to restrict fluid flow through said fluid passageway such that the sealing portions of said shaped sealing surface and said valve seat surface means engage substantially simultaneously upon closure of said rotary valve means.

7. The rotary valve means according to claim 6, wherein said valve closure member forms a plug valve means.

8. The rotary valve means according to claim 6, wherein said shaped sealing surface of said valve closure member and said valve seat surface means are formed so as to sealingly and matingly engage during closure of said valve closure member.

9. The rotary valve means according to claim 8, wherein said valve seat surface means is also shaped to form an arc segment which, when viewed with respect to a plane perpendicular to said pivotal axis, includes a portion of an involute.

10. The rotary valve means according to claim 9, wherein said pivotal axis coincides with the central axis of said involute of said valve seat surface means.

11. The rotary valve means according to claim 6, wherein said pivotal axis coincides with the central axis of said involute.

12. The rotary valve means according to claim 6, wherein said shaped sealing surface and said valve seat surface means engage substantially simultaneously over the entire sealing periphery means during pivotal closure of said valve closure member.

13. Rotary valve means, for controlling the flow of fluid material through a conduit system, comprising:
   valve housing means included therein port means for fluid flow therethrough, valve seat means disposed about said port means, and pivotally supported valve closure member for sealingly engaging said port valve seat to control fluid flow through said conduit system; and
   wherein said valve closure member and said valve seat means are provided with curved sealing surfaces, at least one of which has an arc segment, as devined cross-sectionally through said valve closure member, forming a sufficient portion of an involute so as not to form a portion of an eccentrically mounted circle such that said sealing surfaces all engage substantially simultaneously during closure of said rotary valve means.

14. The rotary valve means according to claim 13, wherein said pivotal axis of said valve closure member is substantially perpendicular to the centerline axis of primary fluid flow through said port means.

15. The rotary valve means according to claim 13, wherein said involute is generated from a base circle about the pivotal axis of said valve closure member.

16. Rotary valve means comprising:
   housing means;
   movable closure member supported in said housing means, each of said housing means and said closure member having seat surface means for engagement with the seat surface means of the other; and
   at least one of said seat surface means defining in cross-section a sufficient portion of an involute so as to not form a portion of an eccentrically mounted circle.

17. The rotary valve means of claim 16 wherein both of said seat surface means define in cross-section a portion of an involute.

18. The rotary valve means of claim 16 wherein at least one of said seat surface means includes a compressible sealing material.

19. The rotary valve means of claim 16 wherein said movable closure member is pivotable about an axis in said housing means.

* * * * *